United States Patent
Garudachari et al.

(10) Patent No.: US 10,280,095 B1
(45) Date of Patent: May 7, 2019

(54) DESALINATION SYSTEM WITH MINERAL RECOVERY

(71) Applicant: KUWAIT INSTITUTE FOR SCIENTIFIC RESEARCH, Safat (KW)

(72) Inventors: Bhadrachari Garudachari, Safat (KW); Mansour Ahmed, Safat (KW); Rajesha Kumar, Safat (KW); Jibu P. Thomas, Safat (KW)

(73) Assignee: Kuwait Institute for Scientific Research, Safat (KW)

( * ) Notice: Subject to any disclaimer, the term of this patent is extended or adjusted under 35 U.S.C. 154(b) by 0 days.

(21) Appl. No.: 16/192,302

(22) Filed: Nov. 15, 2018

(51) Int. Cl.
    *C02F 1/12* (2006.01)
    *C02F 1/04* (2006.01)
    *C02F 1/14* (2006.01)
    *C02F 103/08* (2006.01)

(52) U.S. Cl.
    CPC .............. *C02F 1/12* (2013.01); *C02F 1/043* (2013.01); *C02F 2103/08* (2013.01)

(58) Field of Classification Search
    CPC ......... C02F 1/043; C02F 1/12; C02F 2103/08
    See application file for complete search history.

(56) References Cited

U.S. PATENT DOCUMENTS

| | | | |
|---|---|---|---|
| 2,624,955 A * | 1/1953 | Robison | F26B 5/041 159/10 |
| 3,316,172 A | 4/1967 | Hess | |
| 6,699,369 B1 * | 3/2004 | Hartman | B01D 1/18 203/11 |
| 7,083,730 B2 | 8/2006 | Davis | |
| 2009/0145739 A1 | 6/2009 | Cotten | |
| 2011/0017583 A1 | 1/2011 | Lord | |
| 2011/0198285 A1 * | 8/2011 | Wallace | C01B 7/03 210/638 |
| 2012/0090978 A1 | 4/2012 | Bailie et al. | |
| 2015/0251137 A1 | 9/2015 | Wallace | |
| 2016/0115061 A1 | 4/2016 | Ukai et al. | |

FOREIGN PATENT DOCUMENTS

| | | |
|---|---|---|
| CN | 107029438 A | 8/2017 |
| WO | 2010018249 A1 | 2/2010 |

* cited by examiner

*Primary Examiner* — Brian A McCaig
(74) *Attorney, Agent, or Firm* — Richard C. Litman

(57) ABSTRACT

The desalination system with mineral recovery is a system for desalinating water using spray drying, which allows for both the production of purified water and the recovery of mineral salts. The desalination system with mineral recovery is a two-stage system for zero-liquid discharge (ZLD) desalination of feed water. The feed water may be, for example, seawater, reverse osmosis (RO) brine (i.e., the waste brine from a RO process), nano-filtration (NF) reject, multistage flash (MSF) brine, or the like. The first stage receives the feed water and uses a spray drying process to produce concentrated brine and a first volume of purified water. The concentrated brine is fed to the second stage, which also uses a spray drying process to produce a second volume of purified water and a volume of recovered mineral salts.

19 Claims, 2 Drawing Sheets

DESALINATION SYSTEM WITH MINERAL RECOVERY

BACKGROUND

1. Field

The disclosure of the present patent application relates to water treatment, and particularly to a system for desalinating water using spray drying, which allows for both the production of purified water and the recovery of mineral salts.

2. Description of the Related Art

Spray drying is a method of producing a dry powder from a liquid or slurry by rapid drying with a hot gas. Spray drying is the preferred method of drying of many thermally-sensitive materials, such as foods and pharmaceuticals. In a conventional spray drying system, such as that shown in FIG. 2, air is the heated drying medium. In the conventional spray drying system 100 of FIG. 2, air A is received through inlet 102 and heated by heater 104 (shown here as a conventional heating coil). Heated air HA flows into the drying chamber 108. At the same time, the solution or suspension to be dried S, and an atomization gas AG, are fed into a sprayer 106. This results in the solution or suspension to be dried S being sprayed or atomized as droplets D within drying chamber 108. The heated air HA flowing with the sprayed or atomized droplets D causes the droplets D to dry, resulting in a fine powder FP (i.e., the solid powdered product) flowing in the heated air stream HA. A portion of the fine powder FP will fall, under gravity, into first collection chamber 110. The remainder will flow, along with the heated air stream HA, into cyclone separator 112, where the remainder of the fine powder FP will be separated from the heated air HA, to be collected in second collection chamber 112. The separated heated air HA exits through outlet 116 as exhaust.

Such spray drying systems are commonly used in the manufacture of powdered foods (e.g., powdered milk), pharmaceuticals, and for various industrial materials, such as paint pigments. Spray drying is seen as being preferable over, for example, freeze drying, drum drying and pulse combustion drying, for a variety of reasons. As opposed to freeze drying, spray drying is not only less expensive but produces freely flowing powdered products, which can be easily driven to flow into any desired receptacles and/or in any desired direction. Although drum drying is typically less costly than spray drying, drum drying only produces relatively large flakes of material, and cannot be used to produce fine powders. Pulse combustion drying is also typically less costly than spray drying, but is not capable of producing such a finely powdered product.

Many typical desalination systems can provide high water recovery, but reject large quantities of brine back to the sea. This can disturb aquatic life and increase seawater salinity. Thus, a desalination system with mineral recovery solving the aforementioned problems is desired.

SUMMARY

The desalination system with mineral recovery is a system for desalinating water using spray drying, which allows for both the production of purified water and the recovery of mineral salts. The desalination system with mineral recovery is a two-stage system for zero-liquid discharge (ZLD) desalination of feed water. The feed water may be, for example, seawater, reverse osmosis (RO) brine (i.e., the waste brine from a RO process), nano-filtration (NF) reject, multistage flash (MSF) brine, or the like. The first stage receives the feed water and uses a spray drying process to produce concentrated brine and a first volume of purified water. The concentrated brine is fed to the second stage, which also uses a spray drying process to produce a second volume of purified water and a volume of recovered mineral salts.

The desalination system with mineral recovery includes a first drying chamber, which has a first inlet for receiving a stream of feed water, a first outlet for outputting a first combination of heated air and water vapor, a second inlet for receiving a first stream of heated air, and a second outlet for outputting a volume of concentrated brine. A first polymeric coating may be formed on an inner wall of the first drying chamber. The first polymeric coating may be, for example, polytetrafluoroethylene or the like. A first scraper may be mounted within the first drying chamber for scraping a first volume of mineral salt deposits from the inner wall of the first drying chamber. This scraped mineral residue will mix with the concentrated brine formed in the first drying chamber, as will be described in greater detail below. A feed water tank may be provided such that the feed water tank is in fluid communication with the first inlet of the first drying chamber. The feed water tank stores a volume of the feed water prior to injection thereof to the first drying chamber.

A first spray nozzle is mounted within the first drying chamber and is in fluid communication with the first inlet thereof. The first spray nozzle produces a spray of feed water droplets. A first heat exchanger is in fluid communication with the first outlet of the first drying chamber for receiving the first combination of heated air and water vapor and for cooling the first combination of heated air and water vapor to separate a first volume of purified water from a first stream of cooled air. A first collection tank may be provided for receiving the first volume of purified water.

A first blower is in fluid communication with the first heat exchanger and the second inlet of the first drying chamber. The first blower receives the first stream of cooled air and heats the first stream of cooled air to produce a first stream of heated air. The first blower then blows the first stream of heated air into the first drying chamber through the second inlet thereof. The first stream of heated air evaporates the spray of feed water droplets to produce the first combination of heated air and water vapor and the volume of concentrated brine.

A cooler is in fluid communication with the second outlet of the first drying chamber for receiving the volume of concentrated brine and producing a stream of cooled concentrated brine. A second drying chamber receives the stream of cooled concentrated brine through a first inlet thereof. The second drying chamber also has a first outlet for outputting a second combination of heated air and water vapor, a second inlet for receiving a second stream of heated air, and a second outlet for outputting a volume of mineral salts. A second polymeric coating may be formed on an inner wall of the second drying chamber. The second polymeric coating may be, for example, polytetrafluoroethylene or the like. A second scraper may be mounted within the second drying chamber for scraping a second volume of mineral salt deposits from the inner wall of the second drying chamber. This scraped mineral residue will mix with the volume of mineral salts, which are output from the second drying chamber through the second outlet thereof. A centrifuge may be provided for receiving the stream of cooled concentrated brine from the cooler. The centrifuge uses centrifugal separation to separate solids from the liquid water of the concentrated brine. A brine tank may also be provided for receiving and storing the stream of cooled concentrated brine from the centrifuge prior to injection of the stream of cooled concentrated brine to the second drying chamber.

A second spray nozzle is mounted within the second drying chamber and is in fluid communication with the first inlet thereof. The second spray nozzle produces a spray of brine droplets. A second heat exchanger is in fluid communication with the first outlet of the second drying chamber for receiving the second combination of heated air and water vapor and for cooling the second combination of heated air and water vapor to separate a second volume of purified water from a second stream of cooled air. A second collection tank may be provided for receiving the second volume of purified water.

A second blower is in fluid communication with the second heat exchanger and the second inlet of the second drying chamber. The second blower receives the second stream of cooled air, heats the second stream of cooled air to produce a second stream of heated air, and then blows the second stream of heated air into the second drying chamber through the second inlet thereof. The second stream of heated air evaporates the spray of brine droplets to produce the second combination of heated air and water vapor and the volume of mineral salts. A mineral collection receptacle may be provided for receiving and collecting the volume of mineral salts from the second outlet of the second drying chamber.

These and other features of the present invention will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

The desalination system with mineral recovery 10 is a system for desalinating water using spray drying, which allows for both the production of purified water and the recovery of mineral salts. As will be described in greater detail below, the desalination system with mineral recovery 10 is a two-stage system for zero-liquid discharge (ZLD) desalination of feed water FW. The feed water FW may be, for example, seawater, reverse osmosis (RO) brine (i.e., the waste brine from a RO process), nano-filtration (NF) reject, multistage flash (MSF) brine, or the like. The first stage receives the feed water FW and uses a spray drying process to produce concentrated brine CB and a first volume of purified water PW1. The concentrated brine CB is fed to the second stage, which also uses a spray drying process to produce a second volume of purified water PW2 and a volume of recovered mineral salts MS.

Figure 1:
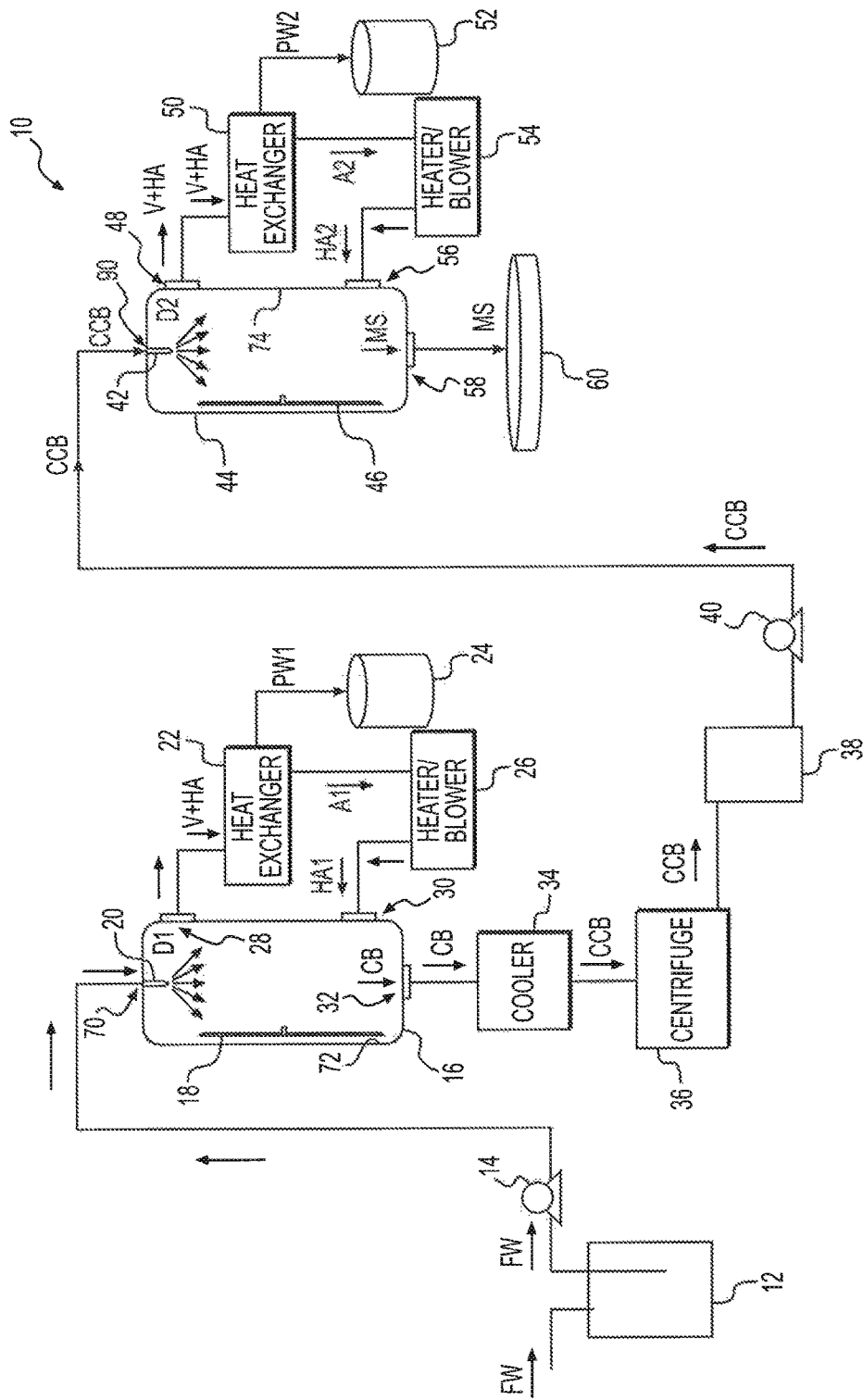
FIG. 1 is diagrammatically illustrates a desalination system with mineral recovery.
Figure 2:
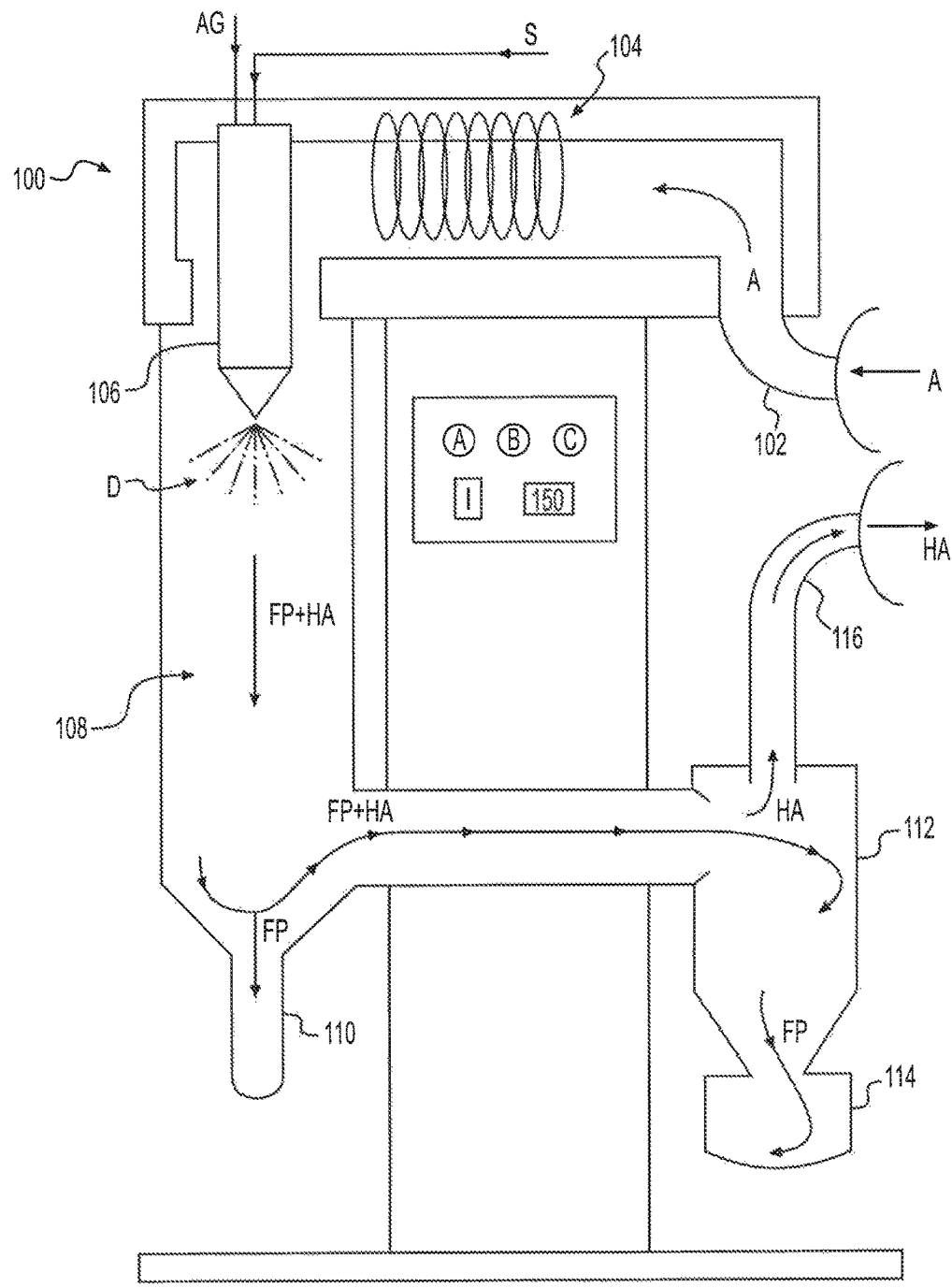
FIG. 2 diagrammatically illustrates a conventional prior art spray drying system.

As shown in FIG. 1, the desalination system with mineral recovery 10 includes a first drying chamber 16, which has a first inlet 70 for receiving the stream of feed water FW, a first outlet 28 for outputting a first combination of heated air HA and water vapor V, a second inlet 30 for receiving a first stream of heated air HA1, and a second outlet 32 for outputting the volume of concentrated brine CB. A first polymeric coating may be formed on an inner wall 72 of the first drying chamber 16. The first polymeric coating may be, for example, polytetrafluoroethylene or the like. As shown, a first scraper 18 may be mounted within the first drying chamber 16 for scraping a first volume of mineral salt deposits from the inner wall 72 of the first drying chamber 16. This scraped mineral residue will mix with the concentrated brine CB formed in the first drying chamber 16, as will be described in greater detail below. As shown, a feed water tank 12 may be provided such that the feed water tank 12 is in fluid communication with the first inlet 70 of the first drying chamber 16. The feed water tank 12 stores a volume of the feed water FW prior to injection thereof to the first drying chamber 16. Additionally, a pump 14 or the like may be provided for driving and controlling the flow of feed water FW as it flows to first inlet 70 of first drying chamber 16.

A first spray nozzle 20 is mounted within the first drying chamber 16 and is in fluid communication with the first inlet 70. The first spray nozzle 20 produces a spray of feed water droplets D1. A first heat exchanger 22 is in fluid communication with the first outlet 28 of the first drying chamber 16 for receiving the first combination of heated air HA and water vapor V, and for cooling the first combination of heated air HA and water vapor V to separate the first volume of purified water PW1 from a first stream of cooled air A1. A first collection tank 24 may be provided for receiving the first volume of purified water PW1.

A first blower 26 is in fluid communication with the first heat exchanger 22 and the second inlet 30 of the first drying chamber 16. The first blower 26 receives the first stream of cooled air A1 and heats the first stream of cooled air A1 to produce a first stream of heated air HA1. The first blower 26 then blows the first stream of heated air HA1 into the first drying chamber 16 through the second inlet 30. The first stream of heated air HA1 evaporates the spray of feed water droplets D1 to produce the first combination of heated air HA and water vapor V and the volume of concentrated brine CB.

A cooler 34 is in fluid communication with the second outlet 32 of the first drying chamber 16 for receiving the volume of concentrated brine CB and producing a stream of cooled concentrated brine CCB. It should be understood that cooler 34 may be any suitable type of cooler, chiller, refrigeration unit or the like. A second drying chamber 44 receives the stream of cooled concentrated brine CC through a first inlet 90. The second drying chamber 44 also has a first outlet 48 for outputting a second combination of heated air HA and water vapor V, a second inlet 56 for receiving a second stream of heated air HA2, and a second outlet 58 for outputting the volume of mineral salts MS.

A second polymeric coating may be formed on an inner wall 74 of the second drying chamber 44. The second polymeric coating may be, for example, polytetrafluoroethylene or the like. A second scraper 46 may be mounted within the second drying chamber 44 for scraping a second volume of mineral salt deposits from the inner wall 74 of the second drying chamber 44. This scraped mineral residue will mix with the volume of mineral salts MS, which are output from the second drying chamber 44 through the second outlet 58. As shown, a centrifuge 36 may be provided for receiving the stream of cooled concentrated brine CCB from cooler 34. The centrifuge 36 uses centrifugal separation to separate solids from the liquid water of the cooled concentrated brine CCB. A brine tank 38 may also be provided for receiving and storing the stream of cooled concentrated brine CCB from the centrifuge 36 prior to injection of the stream of cooled concentrated brine CCB to the second drying chamber 44. A pump 40 or the like may be provided for driving the stream of cooled concentrated brine CCB to the second drying chamber 44 at a controlled rate of flow.

A second spray nozzle 42 is mounted within the second drying chamber 44 and is in fluid communication with the first inlet 90. The second spray nozzle 42 produces a spray of brine droplets D2. A second heat exchanger 50 is in fluid communication with the first outlet 48 of the second drying chamber 44 for receiving the second combination of heated air HA and water vapor V and for cooling the second combination of heated air HA and water vapor V to separate the second volume of purified water PW2 from a second stream of cooled air A2. A second collection tank 52 may be provided for receiving the second volume of purified water PW2.

A second blower 54 is in fluid communication with the second heat exchanger 50 and the second inlet 56 of the second drying chamber 44. The second blower 54 receives the second stream of cooled air A2, heats the second stream of cooled air A2 to produce a second stream of heated air HA2, and then blows the second stream of heated air HA2 into the second drying chamber 44 through the second inlet 56. The second stream of heated air HA2 evaporates the spray of brine droplets D2 to produce the second combination of heated air HA and water vapor V and the volume of mineral salts MS. A mineral collection receptacle 60 may be provided for receiving and collecting the volume of mineral salts MS from the second outlet 58 of the second drying chamber 44.

In order to test the desalination system with mineral recovery 10, an experimental system 10 was built using first and second drying chambers 16, 44, as described above, each with a 5 L capacity, and with the first drying chamber 16 having an integral cooler 34 and centrifuge 36. Feed water FW for the spray drying process was collected from the Doha Reverse Osmosis (RO) Desalination Plant in Doha, Kuwait. The concentration of dissolved salts in the RO brine was 54,900 ppm. The feed was fed to the nozzle 20 of the first drying chamber 16 using a high pressure pump with flow rates of 25, 35, 45 and 55 g/min and with first stream of heated air HA1 being fed (at 90° to the orientation of nozzle 20, similar to that shown in FIG. 1) at temperatures of 60° C., 70° C. and 80° C. Evaporated hot air HA was collected by condensation outside the drying chamber 16 and recirculated, as described above.

The concentrated brine CB was cooled to 10° C. by cooler 34 and transported to centrifuge 36 to separate the crystallized salts. The filtrate from centrifuge 36 was fed into second drying chamber 44 (which also included an integrated cooler and centrifuge to concentrate and isolate the crystallized salts). The above process was repeated for two, four and six cycles. The mineral concentrations were calculated using an Inductively Coupled Argon Plasma (ICAP) emission spectrometer. Tables 1, 3 and 5 below show the brine concentrations for two, four and six fractions (i.e., cycles), respectively, of the above-described process. In Tables 1, 3 and 5, the total dissolved solids are shown in parts per million (ppm), and the conductivity is given in millisiemens per centimeter (ms/cm). Tables 2, 4 and 6 below show the purities of the isolated mineral salts (MS) for two, four and six fractions, respectively.

TABLE 1

Brine Concentration for Two Fractions

| Parameters | Seawater | RO brine | First fraction | Second fraction |
|---|---|---|---|---|
| TDS (ppm) | 45,377 | 54,900 | 162,260 | 204,400 |
| Conductivity (ms/cm) | 58.3 | 69.4 | 204.7 | 220.8 |
| pH | 7.3 | 7.13 | 7.54 | 7.21 |

TABLE 2

Purity of Isolated Minerals (%) for Two Fractions

| Minerals | First fraction salt | Second fraction salt | Final residue |
|---|---|---|---|
| $Mg^{2+}$ (%) | 0 | 0 | 9.505 |
| $Ca^{2+}$ (%) | 93.95 | 88.77 | 1.47 |
| $Na^+$ (%) | 3.01 | 8.65 | 84.21 |
| $K^+$ (%) | 3.03 | 3.3 | 3.62 |
| $Cl^-$ (%) | 0 | 1.15 | 93.03 |
| $SO_4^{2-}$ (%) | 100 | 98.84 | 6.67 |
| $Br^-$ (%) | 0 | 0 | 0.29 |

With reference to Table 2, the possible pure salt from the first fraction is $CaSO_4$, and for the second fraction, the salt is a mixture of $CaSO_4$ and $Na_2SO_4$. Sodium, potassium and chloride impurities in the first and second fractions were removed by a minimal amount of water washing to obtain 100% pure $CaSO_4$. The water wash for the mixed salt removed only sodium, potassium and chloride ions due to high solubility of the ions when compared with calcium and sulfate ions.

TABLE 3

Brine Concentration for Four Fractions

| Parameters | First fraction | Second fraction | Third fraction | Fourth fraction |
|---|---|---|---|---|
| TDS (ppm) | 64,700 | 96,300 | 124,700 | 216,800 |
| Conductivity (ms/cm) | 97.0 | 162.0 | 208.0 | 230.0 |
| pH | 7.25 | 7.59 | 7.55 | 7.21 |

TABLE 4

Purity of Isolated Minerals (%) for Four Fractions

| Minerals | First fraction salt | Second fraction salt | Third fraction salt | Fourth fraction salt | Final residue |
|---|---|---|---|---|---|
| $Mg^{2+}$ (%) | 0 | 0 | 0 | 0 | 41.98 |
| $Ca^{2+}$ (%) | 96.02 | 51.44 | 8.67 | 2.62 | 5.92 |
| $Na^+$ (%) | 3.9 | 47.94 | 91.3 | 96.17 | 38.99 |
| $K^+$ (%) | 0 | 0 | 0 | 1.20 | 13.09 |
| $Cl^-$ (%) | 7.96 | 78.16 | 95.67 | 89.23 | 73.01 |
| $SO_4^{2-}$ (%) | 92.03 | 21.83 | 4.32 | 10.382 | 29.48 |
| $Br^-$ (%) | 0 | 0 | 0 | 0.38 | 1.33 |

With reference to Table 4, the possible pure salt from the first fraction is $CaSO_4$, and for the second fraction, the salt is a mixture of $CaSO_4$ and $NaCl$. The third fraction is a mixture of $NaCl$ and $CaSO_4$, and the fourth fraction is also a mixture of $NaCl$ and $CaSO_4$. The purity of the $CaSO_4$ isolated from the first fraction increased when compared to the two fraction experiment, and the purity of the $NaCl$ was greater than 90%.

TABLE 5

Brine Concentration for Six Fractions

| Parameters | First fraction | Second fraction | Third fraction | Fourth fraction | Fifth fraction | Sixth fraction |
|---|---|---|---|---|---|---|
| TDS (ppm) | 152,000 | 168,620 | 193,400 | 220,000 | 307,200 | 276,450 |
| Conductivity (ms/cm) | 191.4 | 199.0 | 215.0 | 221.0 | 292.8 | 402.5 |
| pH | 7.66 | 7.65 | 7.55 | 7.10 | 8.34 | 8.78 |

TABLE 6

Purity of Isolated Minerals (%) for Six Fractions

| Minerals | First fraction salt | Second fraction salt | Third fraction salt | Fourth fraction salt | Fifth fraction salt | Sixth fraction salt | Final residue |
|---|---|---|---|---|---|---|---|
| $Mg^{2+}$ (%) | 0 | 0 | 0 | 0 | 0 | 0 | 19.05 |
| $Ca^{2+}$ (%) | 88.88 | 89.04 | 91.83 | 9.45 | 3.233 | 3.24 | 1.96 |
| $Na^+$ (%) | 8.23 | 7.12 | 5.22 | 87.83 | 94.48 | 94.033 | 71.77 |
| $K^+$ (%) | 2.88 | 3.82 | 2.94 | 2.71 | 2.28 | 1.95 | 7.21 |
| $Cl^-$ (%) | 4.31 | 2.9 | 1.67 | 90.35 | 93.84 | 92.6 | 87.82 |
| $SO_4^{2-}$ (%) | 95.68 | 97.09 | 98.32 | 9.32 | 5.93 | 7.18 | 11.52 |
| $Br^-$ (%) | 0 | 0 | 0 | 0.31 | 0.22 | 0.21 | 0.64 |

With reference to Table 6, the purity of the calcium sulfate increased steadily from the first to the third fraction, reaching a purity level up to 91%. The fourth fraction increase of sodium chloride purity reached up to 94%. Overall, the most effective process to isolate calcium sulfate and sodium chloride was found to be the four fraction (i.e., four cycle) process. The salt precipitation trend is found to be $CaSO_4 \rightarrow NaCl \rightarrow MgCl_2 \rightarrow KCl$.

It is to be understood that the desalination system with mineral recovery is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A desalination system with mineral recovery, comprising:
    a first drying chamber having an outer wall, an inner wall, a first inlet for receiving a stream of feed water, a first outlet for outputting a first combination of heated air and water vapor, a second inlet for receiving a first stream of heated air, and a second outlet for outputting a volume of concentrated brine, wherein a fluoropolymer coating is formed on the inner wall of the first drying chamber;
    a first spray nozzle mounted within the first drying chamber and in fluid communication with the first inlet, the first spray nozzle producing a spray of feed water droplets;
    a first heat exchanger in fluid communication with the first outlet of the first drying chamber for receiving the first combination of heated air and water vapor and cooling the first combination of heated air and water vapor to separate a first volume of purified water from a first stream of cooled air;
    a first blower in fluid communication with the first heat exchanger and the second inlet of the first drying chamber, the first blower receiving the first stream of cooled air, heating the first stream of cooled air to produce a first stream of heated air, and blowing the first stream of heated air into the first drying chamber through the second inlet thereof, whereby the first stream of heated air evaporates the spray of feed water droplets to produce the first combination of heated air and water vapor and the volume of concentrated brine;
    a cooler in fluid communication with the second outlet of the first drying chamber for receiving the volume of concentrated brine and producing a stream of cooled concentrated brine;
    a second drying chamber having an outer wall, an inner wall, a first inlet for receiving the stream of cooled concentrated brine, a first outlet for outputting a second combination of heated air and water vapor, a second inlet for receiving a second stream of heated air, and a second outlet for outputting a volume of mineral salts;
    a second spray nozzle mounted within the second drying chamber and in fluid communication with the first inlet thereof, the second spray nozzle producing a spray of brine droplets;
    a second heat exchanger in fluid communication with the first outlet of the second drying chamber for receiving the second combination of heated air and water vapor and cooling the second combination of heated air and water vapor to separate a second volume of purified water from a second stream of cooled air; and
    a second blower in fluid communication with the second heat exchanger and the second inlet of the second drying chamber, the second blower receiving the second stream of cooled air, heating the second stream of cooled air to produce a second stream of heated air, and blowing the second stream of heated air into the second drying chamber through the second inlet thereof, whereby the second stream of heated air evaporates the spray of brine droplets to produce the second combination of heated air and water vapor and the volume of mineral salts.

2. The desalination system with mineral recovery as recited in claim 1, further comprising a feed water tank in fluid communication with the first inlet of the first drying chamber, the feed water tank being adapted for storing a volume of the feed water prior to injection thereof to the first drying chamber.

3. The desalination system with mineral recovery as recited in claim 1, further comprising a first scraper mounted within the first drying chamber for scraping a first volume of mineral salt deposits from an inner wall of the first drying chamber.

4. The desalination system with mineral recovery as recited in claim 1, wherein the fluoropolymer coating comprises polytetrafluoroethylene.

5. The desalination system with mineral recovery as recited in claim 4, further comprising a second scraper mounted within the second drying chamber for scraping a second volume of mineral salt deposits from an inner wall of the second drying chamber.

6. The desalination system with mineral recovery as recited in claim 5, further comprising a second fluoropolymer coating formed on the inner wall of the second drying chamber.

7. The desalination system with mineral recovery as recited in claim 6, wherein the fluoropolymer coating comprises polytetrafluoroethylene.

8. The desalination system with mineral recovery as recited in claim 1, further comprising a first collection tank for receiving the first volume of purified water.

9. The desalination system with mineral recovery as recited in claim 8, further comprising a second collection tank for receiving the second volume of purified water.

10. The desalination system with mineral recovery as recited in claim 1, further comprising a centrifuge for receiving the stream of cooled concentrated brine from the cooler, prior to injection of the stream of cooled concentrated brine to the second drying chamber.

11. The desalination system with mineral recovery as recited in claim 10, further comprising a brine tank for receiving and storing the stream of cooled concentrated brine from the centrifuge, prior to injection of the stream of cooled concentrated brine to the second drying chamber.

12. The desalination system with mineral recovery as recited in claim 1, further comprising a mineral collection receptacle for receiving the volume of mineral salts from the second outlet of the second drying chamber.

13. A desalination system with mineral recovery, comprising:

a first drying chamber having a first inlet for receiving a stream of feed water, a first outlet for outputting a first combination of heated air and water vapor, a second inlet for receiving a first stream of heated air, and a second outlet for outputting a volume of concentrated brine, a first polymeric coating being formed on an inner wall of the first drying chamber, the first polymeric coating comprising polytetrafluoroethylene;

a first spray nozzle mounted within the first drying chamber and in fluid communication with the first inlet, the first spray nozzle producing a spray of feed water droplets;

a first heat exchanger in fluid communication with the first outlet of the first drying chamber for receiving the first combination of heated air and water vapor and cooling the first combination of heated air and water vapor to separate a first volume of purified water from a first stream of cooled air;

a first blower in fluid communication with the first heat exchanger and the second inlet of the first drying chamber, the first blower receiving the first stream of cooled air, heating the first stream of cooled air to produce a first stream of heated air, and blowing the first stream of heated air into the first drying chamber through the second inlet thereof, whereby the first stream of heated air evaporates the spray of feed water droplets to produce the first combination of heated air and water vapor and the volume of concentrated brine;

a cooler in fluid communication with the second outlet of the first drying chamber for receiving the volume of concentrated brine and producing a stream of cooled concentrated brine;

a second drying chamber having a first inlet for receiving the stream of cooled concentrated brine, a first outlet for outputting a second combination of heated air and water vapor, a second inlet for receiving a second stream of heated air, and a second outlet for outputting a volume of mineral salts, a second polymeric coating being formed on an inner wall of the second drying chamber, the second polymeric coating comprising polytetrafluoroethylene;

a second spray nozzle mounted within the second drying chamber and in fluid communication with the first inlet thereof, the second spray nozzle producing a spray of brine droplets;

a second heat exchanger in fluid communication with the first outlet of the second drying chamber for receiving the second combination of heated air and water vapor and cooling the second combination of heated air and water vapor to separate a second volume of purified water from a second stream of cooled air; and a second blower in fluid communication with the second heat exchanger and the second inlet of the second drying chamber, the second blower receiving the second stream of cooled air, heating the second stream of cooled air to produce a second stream of heated air, and blowing the second stream of heated air into the second drying chamber through the second inlet thereof, whereby the second stream of heated air evaporates the spray of brine droplets to produce the second combination of heated air and water vapor and the volume of mineral salts.

14. The desalination system with mineral recovery as recited in claim 13, further comprising a feed water tank in fluid communication with the first inlet of the first drying chamber, the feed water tank being adapted for storing a volume of the feed water prior to injection thereof to the first drying chamber.

15. The desalination system with mineral recovery as recited in claim 13, further comprising a first scraper mounted within the first drying chamber for scraping a first volume of mineral salt deposits from the inner wall of the first drying chamber.

16. The desalination system with mineral recovery as recited in claim 15, further comprising a second scraper mounted within the second drying chamber for scraping a second volume of mineral salt deposits from the inner wall of the second drying chamber.

17. The desalination system with mineral recovery as recited in claim 13, further comprising a first collection tank for receiving the first volume of purified water.

18. The desalination system with mineral recovery as recited in claim 17, further comprising a second collection tank for receiving the second volume of purified water.

19. The desalination system with mineral recovery as recited in claim 13, further comprising:

a centrifuge for receiving the stream of cooled concentrated brine from the cooler, prior to injection of the stream of cooled concentrated brine to the second drying chamber;

a brine tank for receiving and storing the stream of cooled concentrated brine from the centrifuge, prior to injection of the stream of cooled concentrated brine to the second drying chamber; and a mineral collection receptacle for receiving the volume of mineral salts from the second outlet of the second drying chamber.

* * * * *